United States Patent
Ihara et al.

(10) Patent No.: US 11,180,662 B2
(45) Date of Patent: Nov. 23, 2021

(54) ULTRAVIOLET ABSORBING HARDCOAT

(71) Applicant: 3M INNOVATIVE PROPERTIES COMPANY, St. Paul, MN (US)

(72) Inventors: Taiki Ihara, Tokyo (JP); Naota Sugiyama, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 302 days.

(21) Appl. No.: 16/328,624

(22) PCT Filed: Aug. 25, 2017

(86) PCT No.: PCT/US2017/048573
§ 371 (c)(1),
(2) Date: Feb. 26, 2019

(87) PCT Pub. No.: WO2018/052686
PCT Pub. Date: Mar. 22, 2018

(65) Prior Publication Data
US 2021/0139660 A1    May 13, 2021

Related U.S. Application Data

(60) Provisional application No. 62/394,330, filed on Sep. 14, 2016.

(51) Int. Cl.
*C09D 5/00* (2006.01)
*C08J 7/043* (2020.01)
(Continued)

(52) U.S. Cl.
CPC ................ *C09D 5/00* (2013.01); *C08J 7/043* (2020.01); *C08J 7/046* (2020.01); *C08K 3/22* (2013.01);
(Continued)

(58) Field of Classification Search
None
See application file for complete search history.

(56) References Cited

U.S. PATENT DOCUMENTS 4,262,072 A    4/1981    Wendling
4,885,332 A    12/1989   Bilkadi
(Continued)

FOREIGN PATENT DOCUMENTS

CN    104774550 A    7/2015
EP    2239308        10/2010
(Continued)

OTHER PUBLICATIONS

Girigoswami, "Studies on polymer-coated zinc oxide nanoparticles. UV-blocking efficacy and in vivo toxicity", Materials Science and Engineering, 2015, vol. 56, pp. 501-510, XP029252702.
(Continued)

*Primary Examiner* — Robert T Butcher

(57) ABSTRACT

Ultraviolet absorbing hardcoat and precursor therefore comprising a binder and nanoparticles in a range from 1 to 90 wt. %, based on the total weight of the hardcoat, wherein at least a portion of the ZnO nanoparticles are surface modified with L-lysine and have a silica coating thereon. Hardcoats described herein are useful, for example, for optical displays (e.g., cathode ray tube (CRT) and light emitting diode (LED) displays), personal digital assistants (PDAs), cell phones, liquid crystal display (LCD) panels, touch-sensitive screens, removable computer screens, window film, and goggles.

8 Claims, 7 Drawing Sheets

(51) Int. Cl.
*C08J 7/046* (2020.01)
*C08K 3/22* (2006.01)
*C08K 9/02* (2006.01)
*C08K 9/04* (2006.01)
*C08L 33/08* (2006.01)

(52) U.S. Cl.
CPC .......... *C08K 9/02* (2013.01); *C08K 9/04* (2013.01); *C08L 33/08* (2013.01); *C08J 2333/08* (2013.01); *C08K 2003/2296* (2013.01); *C08K 2201/011* (2013.01); *C08L 2201/10* (2013.01); *C08L 2203/206* (2013.01)

(56) References Cited

U.S. PATENT DOCUMENTS

| | | | |
|---|---|---|---|
| 5,104,929 | A | 4/1992 | Bilkadi |
| 5,409,778 | A * | 4/1995 | Patel ............ B05D 7/53 428/412 |
| 5,633,049 | A | 5/1997 | Bilkadi |
| 5,914,162 | A | 6/1999 | Bilkadi |
| 6,467,897 | B1 | 10/2002 | Wu |
| 7,074,463 | B2 | 7/2006 | Jones |
| 7,309,517 | B2 | 12/2007 | Jones |
| 2013/0315972 | A1 * | 11/2013 | Krasnow ............ A01N 59/20 424/409 |

FOREIGN PATENT DOCUMENTS

| | | | |
|---|---|---|---|
| JP | 2016/003319 | * | 1/2016 |
| WO | WO 2008-064114 | | 5/2008 |
| WO | WO 2012-106507 | | 8/2012 |
| WO | WO 2014-078039 | | 5/2014 |
| WO | WO 2015-171340 | | 11/2015 |
| WO | WO 2017-112459 | | 6/2017 |

OTHER PUBLICATIONS

Hong, "Synthesis and surface modification of ZnO nanoparticles", Chemical Engineering Journal, 2006, vol. 119, No. 2-3, pp. 71-81. XP028035989.

Lucia Marsich, "lysine-Coated Silver Nanoparticles as Positively Charged Substrates for Surface-Enhanced Raman Scattering", Langmuir, 2012, vol. 28, No. 37, p. 13166-13171. XP55175035.

Shankar, "Amino acid mediated synthesis of silver nanoparticles and preparation of antimicrobial agar/silver nanoparticles composite films", Carbohydrate Polymers, 2015, vol. 130, pp. 353-363. XP029175068.

International Search report for PCT International Application No. PC/US2017/048573 dated Nov. 12, 2017, 5 pages.

* cited by examiner

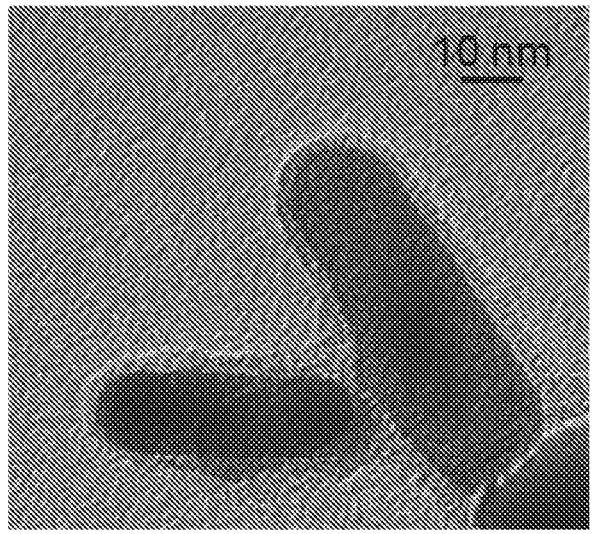
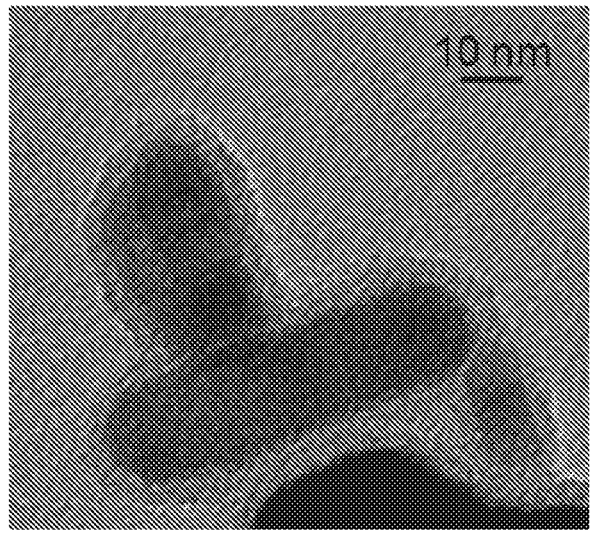
FIG. 3A  FIG. 3B
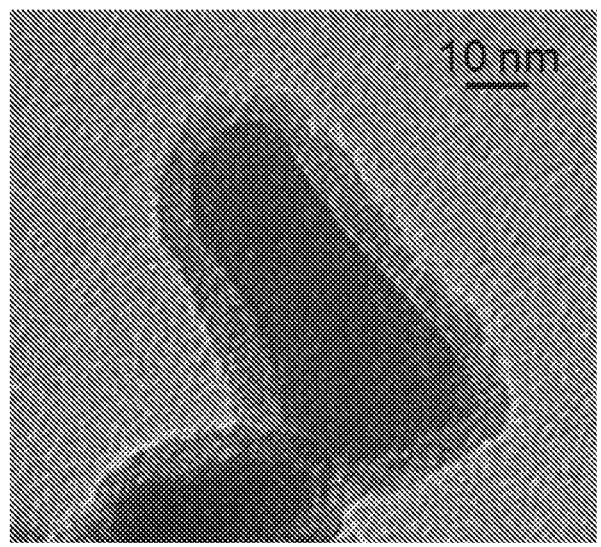
FIG. 3C

ULTRAVIOLET ABSORBING HARDCOAT

CROSS REFERENCE TO RELATED APPLICATIONS

This application is a national stage filing under 35 U.S.C. 371 of PCT/US2017/048573, filed Aug. 25, 2017, which claims the benefit of U.S. Provisional Application No. 62/394,330, filed Sep. 14, 2016, the disclosure of which is incorporated by reference in its/their entirety herein.

BACKGROUND

A variety of coatings and films are used to protect windows (e.g., building and automobile windows) and optical displays such as cathode ray tube (CRT) and light emitting diode (LED) displays.

Additional options for protecting windows and optical displays are desired, particularly those having relatively excellent hardness, weatherability, and optical properties (e.g., visibility) at the same time.

SUMMARY

In one aspect, the present disclosure provides an ultraviolet (UV) absorbing hardcoat comprising a binder (e.g., UV cured acrylate or thermally cured acrylate) and a mixture of ZnO nanoparticles in a range from 1 to 90 (in some embodiments, 5 to 90, 10 to 90, 25 to 90, 40 to 90, 50 to 90, 50 to 80, or even 60 to 80) wt. %, based on the total weight of the hardcoat, wherein at least a portion (in some embodiments, at least 50, 55, 60, 65, 70, 75, 80, 85, 90, 95, 96, 97, 98, 99, or even 100 percent by number) of the ZnO nanoparticles are surface modified with L-lysine and have a silica coating thereon.

In another aspect, the present disclosure provides an article comprising a substrate having a surface, and a hardcoat layer disposed on the surface of the substrate, wherein the hardcoat layer comprises a hardcoat described herein.

In another aspect, the present disclosure provides a hardcoat precursor comprising a binder precursor and a mixture of ZnO nanoparticles in a range from 1 to 90 (in some embodiments, 5 to 95, 5 to 90, 25 to 90, 40 to 90, 50 to 90, 50 to 80, or even 60 to 80) wt. %, based on the total weight of the hardcoat precursor, wherein at least a portion (in some embodiments, at least 50, 55, 60, 65, 70, 75, 80, 85, 90, 95, 96, 97, 98, 99, or even 100 percent by number) of the ZnO nanoparticles are surface modified with L-lysine and have a silica coating thereon.

Embodiments of hardcoats described herein typically have good transparency and hardness, and are useful, for example, for optical displays (e.g., cathode ray tube (CRT) and light emitting diode (LED) displays), personal digital assistants (PDAs), cell phones, liquid crystal display (LCD) panels, touch-sensitive screens, removable computer screens, window film, and goggles.

BRIEF DESCRIPTION OF THE DRAWINGS

FIG. 3A is another TEM digital photomicrograph of Example 1.

FIG. 3B is another TEM digital photomicrograph of Example 1.

FIG. 3C is another TEM digital photomicrograph of Example 1.

DETAILED DESCRIPTION

Figure 1A:
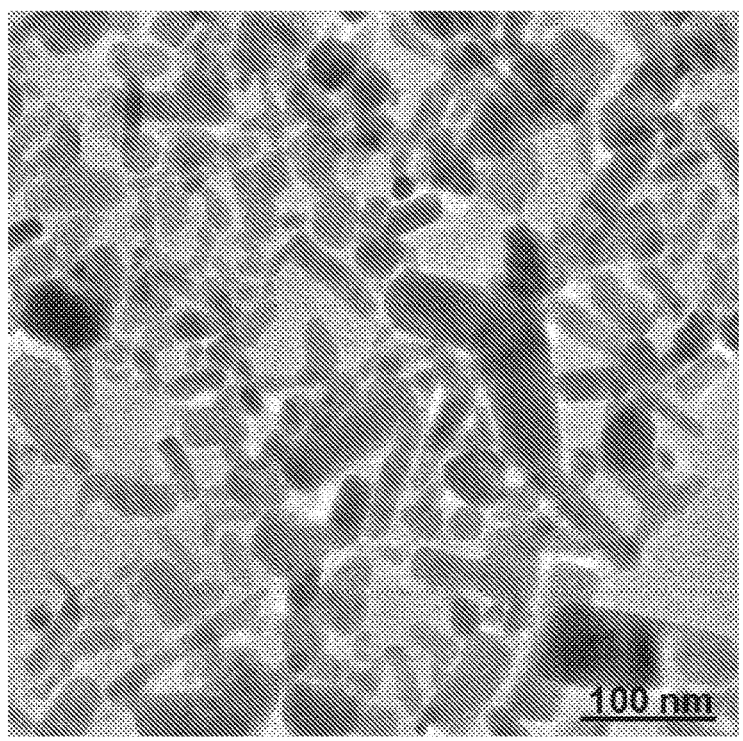
FIG. 1A is a transmission electron microscopy (TEM) digital photomicrograph of "as received" ZnO nanoparticles (obtained under the trade designation "NANOBYK-3820" from BYK-Chemie GmbH, Wesel, Germany).
Figure 1B:
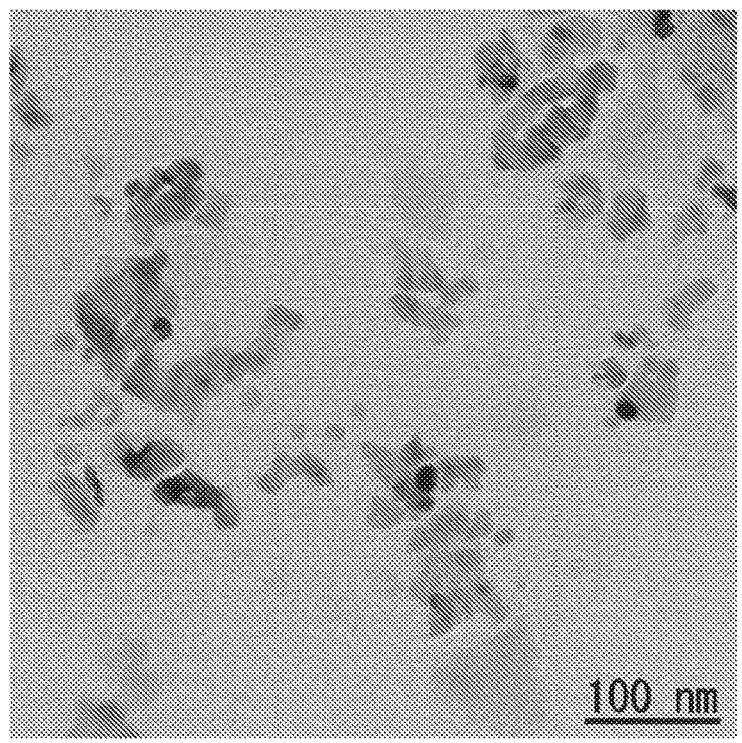
FIG. 1B is a TEM digital photomicrograph of "as received" ZnO nanoparticles (obtained under the trade designation "AQ-E3913" from Resino Color Industry Co., Ltd., Osaka, Japan).

Exemplary binder precursors include UV curable acrylate or thermal curable acrylate resin obtained by polymerizing curable monomers/oligomers or sol-gel glass. More specific examples of resins include acrylic resin, urethane resin, epoxy resin, phenol resin, and (poly)vinyl alcohol. Further, curable monomers or oligomers may be selected from curable monomers or oligomers known in the art. In some embodiments, the resins include dipentaerythritol pentaacrylate (available, for example, under the trade designation "SR399" from Sartomer Company, Exton, Pa.), pentaerythritol triacrylate isophorone diisocyanate (IPDI) (available, for example, under the trade designation "UX5000" from Nippon Kayaku Co., Ltd., Tokyo, Japan), urethane acrylate (available, for example, under the trade designations "UV1700B" from Nippon Synthetic Chemical Industry Co., Ltd., Osaka, Japan; and "UB6300B" from Nippon Synthetic Chemical Industry Co., Ltd., Osaka, Japan), trimethyl hydroxyl di-isocyanate/hydroxy ethyl acrylate (TMHDI/HEA), (available, for example, under the trade designation "EB4858" from Daicel Cytec Company Ltd., Tokyo, Japan), polyethylene oxide (PEO) modified bis-A diacrylate (available, for example, under the trade designation "R551" from Nippon Kayaku Co., Ltd., Tokyo, Japan), PEO modified bis-A epoxyacrylate (available, for example, under the trade designation "3002M" from Kyoeisha Chemical Co., Ltd., Osaka, Japan), silane based UV curable resin (available, for example, under the trade designation "SK501M" from Nagase ChemteX Corporation, Osaka, Japan), and 2-phenoxyethyl methacrylate (available, for example, under the trade designation "SR340" from Sartomer Company); and mixtures of thereof. Use, for example, of about 1.25 wt. % to about 20 wt. % of 2-phenoxyethyl methacrylate has been observed to improve adhesion to polycarbonate. Use of difunctional resins (e.g., PEO modified bis-A diacrylate ("R551")) and trimethyl hydroxyl di-isocyanate/hydroxy ethyl acrylate (TMHDI/HEA) (available, for example, under the trade designation "EB4858" from Daicel Cytec Company, Ltd.) have been observed to simultaneously improve the hardness, impact resistance, and flexibility of the hardcoat. In some embodiments, it may be desirable to use curable monomers or oligomers capable of forming three-dimensional structure.

The amount of binder in the precursor to form the hardcoat is typically sufficient to provide the hardcoat with about 99 wt. % to about 10 wt. % (in some embodiments, about 95 wt. % to about 5 wt. %, about 90 wt. % to about 10 wt. %, about 75 wt. % to about 10 wt. %, about 60 wt. % to about 10 wt. %, about 50 wt. % to about 10 wt. %, or even about 40 wt. % to about 20 wt. %) binder, based on the total weight of the hardcoat.

Optionally, the hardcoat precursor further comprises crosslinking agents. Exemplary crosslinking agents include poly (meth)acryl monomers selected from the group consisting of (a) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (b) tri(meth)acryl containing compounds such as glycerol triacrylate, trimethylolpropane triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), pentaerythritol triacrylate, propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (c) higher functionality (meth)acryl containing compounds such as ditrimethylolpropane tetraacrylate, dipentaerythritol pentaacrylate, ethoxylated (4) pentaerythritol tetraacrylate, pentaerythritol tetraacrylate, caprolactone modified dipentaerythritol hexaacrylate; (d) oligomeric (meth)acryl compounds such as, for example, urethane acrylates, polyester acrylates, epoxy acrylates; polyacrylamide analogues of the foregoing; and combinations thereof. Such materials are commercially available, including at least some that are available, for example, from Sartomer Company; UCB Chemicals Corporation, Smyrna, Ga.; and Aldrich Chemical Company, Milwaukee, Wis. Other useful (meth)acrylate materials include hydantoin moiety-containing poly(meth)acrylates, for example, as reported in U.S. Pat. No. 4,262,072 (Wendling et al.).

An exemplary crosslinking agent comprises at least three (meth)acrylate functional groups. Exemplary commercially available crosslinking agents include those available from Sartomer Company, such as trimethylolpropane triacrylate (TMPTA) (available under the trade designation "SR351"), pentaerythritol tri/tetraacrylate (PETA) (available under the trade designations "SR444" and "SR295"), and pentaerythritol pentaacrylate (available under the trade designation "SR399"). Further, mixtures of multifunctional and lower functional acrylates, such as a mixture of PETA and phenoxyethyl acrylate (PEA), available from Sartomer Company under the trade designation "SR399," may also be utilized. These exemplary crosslinking agents may be used as the curable monomers or oligomers.

In some embodiments, the binder comprises monofunctional acrylate (e.g., 1.25 wt. % to 20 wt. % in solid of monofunctional acrylate, based on the total weight of the binder). In some embodiments, the binder comprises difunctional acrylate (e.g., 1.25 wt. % to 20 wt. % in solid of difunctional acrylate, based on the total weight of the binder). In some embodiments, the binder comprises multifunctional (e.g., trifunctional or tetrafunctional) acrylate (e.g., 20 wt. % to 80 wt. % (in some embodiments, 60 wt. % to 80 wt. %) in solid of multifunctional (e.g., trifunctional or tetrafunctional) acrylate, based on the total weight of the binder).

Suitable ZnO nanoparticles are known in the art and include those commercially available from BYK-Chemie GmbH, Wesel, Germany under the trade designation "NANOBYK3820", from NanoMaterials Technology Pte, Ltd., Bukit Batok Crescent, Singapore, under the trade designation "NANO-D 133W" and from Resino Color Industry Co., Ltd., Osaka, Japan, under the trade designation "AQ-E3913."

In some embodiments, the mixture of ZnO nanoparticles present in the hardcoat is in a range from about 1 wt. % to about 90 wt. %, about 5 wt. % to about 90 wt. %, about 10 wt. % to about 90 wt. %, about 25 wt. % to about 90 wt. %, about 40 wt. % to about 90 wt. %, about 50 wt. % to about 90 wt. %, about 50 wt. % to about 80 wt. %, or even about 50 wt. % to about 90 wt. %, based on the total weight of the hardcoat.

In some embodiments, the ZnO nanoparticles themselves (i.e., absent any coating) have a particle size in a range from about 10 nm to 100 nm (in some embodiments, 25 nm to 100 nm, 25 nm to 80 nm, 50 nm to 80 nm, or even 60 nm to 80 nm). The average diameter of nanoparticles is measured with transmission electron microscopy (TEM) using commonly employed techniques in the art. For measuring the average particle size of nanoparticles, sol samples can be prepared for TEM imaging by placing a drop of the sol sample onto a 400 mesh copper TEM grid with an ultra-thin carbon substrate on top of a mesh of lacey carbon (available from Ted Pella Inc., Redding, Calif.). Part of the drop can be removed by touching the side or bottom of the grid with filter paper. The remainder can be allowed to dry. This allows the particles to rest on the ultra-thin carbon substrate and to be imaged with the least interference from a substrate. Then, TEM images can be recorded at multiple locations across the grid. Enough images are recorded to allow sizing of 500 to 1000 particles. The average diameters of the nanoparticles can then be calculated based on the particle size measurements for each sample. TEM images can be obtained using a high resolution transmission electron microscope (available under the trade designation "HITACHI H-9000" from Hitachi, Tokyo, Japan) operating at 300 KV (with a $LaB_6$ source). Images can be recorded using a camera (e.g., Model No. 895, 2 k×2 k chip, available under the trade designation "GATAN ULTRASCAN CCD" from Gatan, Inc., Pleasanton, Calif.). Images can be taken at a magnification of 50,000× and 100,000×. For some samples, images may be taken at a magnification of 300,000×.

At least a portion (in some embodiments, at least 50, 55, 60, 65, 70, 75, 80, 85, 90, 95, 96, 97, 98, 99, or even 100 percent by number) of the ZnO nanoparticles are surface modified with L-lysine and have a silica coating thereon.

The surfaces of the ZnO nanoparticles can be modified, for example, by adding L-lysine to an aqueous-ethanol mixture containing the ZnO nanoparticles dispersed therein and then stirring at room temperature. The resulting mixture can be heated (e.g., in an oil bath) in a container (e.g., a glass jar) at an elevated temperature (e.g., 60° C.) for several hours (e.g., 16 hours) while stirring the mixture. Further, if the surface modified ZnO nanoparticles are to be coated with silica, the silica coating can be provided, for example, by adding tetraethyl orthosilicate (TEOS) to the resulting heated mixture and stirring. Then, that resulting mixture can be placed in a closed cylindrical polytetrafluoroethylene-lined stainless steel autoclave, which in turn can be placed in an oven, for example, at an elevated temperature (e.g., 150° C.) for several hours (e.g., 6 hours).

In some embodiments, the silica coating has an average thickness of at least 2 nm (in some embodiments, at least 3 nm, 4 nm, 5 nm, 10 nm, 15 nm, 20 nm, 25 nm, or even at least 50 nm; in some embodiments, in a range from 2 nm to 50 nm, 2 nm to 25 nm, or even 2 nm to 10 nm).

Optionally, the silica coating is modified with a surface treatment agent. In general, a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes, and titanates. The preferred type of treatment agent is determined, in part, by the chemical nature of the nanoparticle surface. Silanes are preferred for silica and other siliceous fillers. Silanes and carboxylic acids are preferred for metal oxides. Surface modification can be done either subsequent to mixing with the monomers or after mixing. When silanes are employed, reaction of the silanes with the nanoparticle surface is preferred prior to incorporation into the binder. The required amount of surface treatment agent is dependent upon several factors such as particle size, particle type, surface treatment agent molecular weight, and surface treatment agent type. In general, it is preferred that about a monolayer of surface treatment agent be attached to the surface of the particle. The attachment procedure, or reaction conditions required, also depend on the surface treatment agent used. When employing silanes, surface treatment at elevated temperatures, under acidic or basic conditions, for about 1 hour to 24 hours is preferred. Surface treatment agents such as carboxylic acids do not usually require elevated temperatures or extended time.

Representative embodiments of surface treatment agents include compounds such as isooctyl trimethoxy-silane, N-(3-triethoxysilylpropyl) methoxyethoxyethoxyethyl carbamate, polyalkyleneoxide alkoxysilane (available, for example, under the trade designation "SILQUEST A1230" from Momentive Specialty Chemicals, Inc., Columbus, Ohio), N-(3-triethoxysilylpropyl) methoxyethoxyethoxyethyl carbamate, 3-(methacryloyloxy)propyltrimethoxysilane, 3-(acryloxypropyl)trimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof.

Optionally, the hardcoat may further include known additives such as an anti-fog agent, an antistatic agent, an easy-clean agent such as an anti-finger printing agent, an anti-oil agent, an anti-lint agent, or an anti-smudge agent, or other agents adding an easy-cleaning function.

Addition of hexafluoropropylene oxide urethane acrylate (HFPO) or modified HFPO to the hardcoat has been observed to improve easy-clean (e.g., anti-finger printing, anti-oil, anti-lint and/or anti-smudge) functions of the hardcoat. Exemplary amounts of HFPO and modified HFPO include in a range from about 0.01 wt. % to about 5.0 wt. % (in some embodiments, about 0.05 wt. % to about 1.5 wt. %, or about 0.1 wt. % to about 0.5 wt. %), based on the total weight of the hardcoat.

Inclusion of silicon polyether acrylate (available, for example, under the trade designation "TEGORAD 2250" from Evonic Goldschmidt GmbH, Essen, Germany) in the hardcoat has also been observed to improve easy-clean function of the hardcoat. Exemplary amounts of silicon polyether acrylate include in a range from about 0.01 wt. % to about 5.0 wt. % (in some embodiments, about 0.05 wt. % to about 1.5 wt. %, or even about 0.1 wt. % to about 0.5 wt. %), based on the total weight of the hardcoat.

The specified components of the hardcoat precursor can be combined and processed into a hardcoat as is generally known in the art. For example, the following processes may be used. The hardcoat precursor can be coated onto the substrate by known coating processes such as bar coating, dip coating, spin coating, capillary coating, spray coating, gravure coating, or screen printing. After drying, the coated hardcoat precursor can be cured with known polymerization methods such as ultraviolet (UV) or thermal polymerization.

In some embodiments, depending, for example, on the curable monomers and/or oligomers used, a solvent-free (i.e., organic solvent free, or 100% water) process may be used to form the coatings.

In some embodiments, two or more different sized nanoparticles sols, with or without modification, may be mixed with curable monomers and/or oligomers in solvent with an initiator, which is adjusted to a desired weight % (in solid) by adding the solvent to furnish a hardcoat precursor. In some embodiments, a portion of the ZnO nanoparticles coated with silica may not be surface modified with L-lysine.

Typically, the thickness of the hardcoat is in a range from about 80 nanometers to about 30 micrometers (in some embodiments, about 200 nanometers to about 20 micrometers, or even about 1 micrometer to about 10 micrometers). Typically, by using nanoparticles, thicker and harder hardcoat layers can be obtained.

In some embodiments, hardcoats described herein have very favorable weatherability characteristics. Exemplary embodiments have been observed to maintain the haze value and show higher abrasion resistance even after accelerated weather testing (as defined in the Examples) as compared the same hardcoat without non-functional ZnO nanoparticles. Such exemplary embodiments have also been observed to exhibit low catalytic activity. Such exemplary embodiments have also been observed to exhibit improved abrasion resistance and lower haze.

Hardcoats described herein are useful, for example, for optical displays (e.g., cathode ray tube (CRT), light emitting diode (LED) displays), plastic cards, lenses, camera bodies, fans, door knobs, tap handles, mirrors, and home electronics such as cleaners or washing machines, and for optical displays (e.g., cathode ray tube (CRT) and light emitting diode (LED) displays), personal digital assistants (PDAs), cell phones, liquid crystal display (LCD) panels, touch-sensitive screens, removable computer screens, window film, and goggles. Further, the hardcoat described herein may be useful, for example, for furniture, doors and windows, toilet bowls and bath tubs, vehicle interiors/exteriors, camera lenses or glasses, or solar panels.

Exemplary substrates for having the hardcoat described herein include a film, a polymer plate, a sheet glass, and a metal sheet. The film may be transparent or nontransparent. As used herein "transparent" refers that total transmittance is 90% or more and "nontransparent" refers that total transmittance is not more than 90%. Exemplary films includes those made of polycarbonate, poly(meth)acrylate (e.g., polymethyl methacrylate (PMMA)), polyolefins (e.g., polypropylene (PP)), polyurethane, polyesters (e.g., polyethylene terephthalate (PET)), polyamides, polyimides, phenolic resins, cellulose diacetate, cellulose triacetate, polystyrene, styrene-acrylonitrile copolymers, acrylonitrile butadiene styrene copolymer (ABS), epoxies, polyethylene, polyacetate and vinyl chloride, or glass. The polymer plate may be transparent or nontransparent. Exemplary polymer plates include those made of polycarbonate (PC), polymethyl methacrylate (PMMA), styrene-acrylonitrile copolymers, acrylonitrile butadiene styrene copolymer (ABS), a blend of PC and PMMA, or a laminate of PC and PMMA. The metal sheet may be flexible or rigid. As used herein, "flexible metal sheet" refers to metal sheets that can undergo mechanical stresses, such as bending or stretching and the like, without significant irreversible change, and "rigid metal sheet" refers to metal sheets that cannot undergo mechanical stresses, such as bending or stretching and the like, without significant irreversible change. Exemplary flexible metal sheets include those made of aluminum. Exemplary rigid metal sheets include those made of aluminum, nickel, nickel-chrome, and stainless steel. When metal sheets are used, it may be desirable to apply a primer layer between the hardcoat and the substrate.

Typically the thickness of the film substrate is in a range from about 5 micrometers to about 500 micrometers. Typically, the thickness for a polymer plate is in a range from about 0.5 mm to about 10 mm (in some embodiments, from about 0.5 mm to about 5 mm, or even about 0.5 mm to about 3 mm)), although thickness outside of these ranges may also useful. For sheet glass or metal sheet as the substrate, the typical thickness is in a range from about 5 micrometers to about 500 micrometers, or (in some embodiments, from about 0.5 mm to about 10 mm, 0.5 mm to about 5 mm, or even about 0.5 mm to about 3 mm), although thickness outside of these ranges may also be useful.

Hardcoats described herein may be disposed on more than one surface of the substrate, for those substrates having more than one surface. Also, more than one hardcoat layer may be applied to a surface. Typically, the thickness of hardcoat layers described herein are in a range from about 80 nanometers to about 30 micrometers (in some embodiments, about 200 nanometers to about 20 micrometers, or even about 1 micrometer to about 10 micrometers), although thicknesses outside of these ranges may also be useful.

In some embodiments, the article may further comprise a functional layer such as primer layer between the hardcoat layer and the substrate. Optionally, an adhesive layer may be applied on the opposite surface of the substrate from the hardcoat layer. Exemplary adhesives are known in the art, including acrylic adhesive, urethane adhesive, silicone adhesive, polyester adhesive, and rubber adhesive.

Further, if an adhesive layer is present, optionally a linear (e.g., release liner) can be included over the adhesive layer. Release liners are known in the art and include paper and a polymer sheet.

The hardcoat precursor can be prepared by combining components using techniques known in the art such as adding curable monomers and/or oligomers in solvent (e.g., methyl ethyl ketone (MEK) or 1-methoxy-2-propanol (MP-OH)) with an inhibitor to solvent. In some embodiments, no solvent can be used depending on the curable monomers and/or oligomers used. The hardcoat precursor may further include known additives such as an anti-fog agent and/or an antistatic agent.

Techniques for applying the hardcoat precursor (solution) to the surface of the substrate are known in the art and include bar coating, dip coating, spin coating, capillary coating, spray coating, gravure coating and screen printing. The coated hardcoat precursor can be dried and cured by polymerization methods known in the art, including UV or thermal polymerization.

Exemplary Embodiments

1A. An ultraviolet absorbing hardcoat comprising:
a binder (e.g., UV cured acrylate or thermally cured acrylate), and
a mixture of ZnO nanoparticles in a range from 1 to 90 (in some embodiments, 5 to 90, 10 to 90, 25 to 90, 40 to 90, 50 to 90, 50 to 80, or even 60 to 80) wt. %, based on the total weight of the hardcoat, wherein at least a portion (in some embodiments, at least 50, 55, 60, 65, 70, 75, 80, 85, 90, 95, 96, 97, 98, 99, or even 100 percent by number) of the ZnO nanoparticles are surface modified with L-lysine and have a silica coating thereon.

2A. The ultraviolet absorbing hardcoat of Exemplary Embodiment 1A, wherein the ZnO nanoparticles themselves (i.e., absent any coating) have a particle size in a range from about 10 nm to 100 nm (in some embodiments, 25 nm to 100 nm, 25 nm to 80 nm, 50 nm to 80 nm, or even 60 nm to 80 nm).

3A. The hardcoat of any preceding A Exemplary Embodiment, wherein the silica coating has an average thickness of at least 2 nm (in some embodiments, at least 3 nm, 4 nm, 5 nm, 10 nm, 15 nm, 20 nm, 25 nm, or even at least 50 nm; in some embodiments, in a range from 2 nm to 50 nm, 2 nm to 25 nm, or even 2 nm to 10 nm).

4A. The hardcoat of any preceding A Exemplary Embodiment, wherein the silica coating is surface modified (e.g., by a silane coupling agent).

5A. The hardcoat of any preceding A Exemplary Embodiment having a haze value less than 3% and ∠ haze value less than 0.2% (as determined by the test described in the Examples).

6A. An article comprising:
a substrate having a surface, and
a hardcoat layer disposed on the surface of the substrate, wherein the hardcoat layer comprises the hardcoat according to any preceding A Exemplary Embodiment.

7A. The article of Exemplary Embodiment 6A, wherein the substrate is a film.

8A. The article of Exemplary Embodiment 6A, wherein the substrate is a polymer plate.

9A. The article of any of Exemplary Embodiments 6A to 8A, further comprising a primer layer between the substrate and the hardcoat layer.

1B. An ultraviolet absorbing hardcoat precursor comprising:
a binder precursor (e.g., UV curable acrylate or thermally curable acrylate), and
a mixture of ZnO nanoparticles in a range from 1 to 90 (in some embodiments, 5 to 95, 5 to 90, 25 to 90, 40 to 90, 50 to 90, 50 to 80, or even 60 to 80) wt. %, based on the total weight of the hardcoat precursor, wherein at least a portion (in some embodiments, at least 50, 55, 60, 65, 70, 75, 80, 85, 90, 95, 96, 97, 98, 99, or even 100 percent by number) of the ZnO nanoparticles are surface modified with L-lysine and have a silica coating thereon.

2B. The ultraviolet absorbing hardcoat precursor of Exemplary Embodiment 1B, wherein the ZnO nanoparticles themselves (i.e., absent any coating) have an average particle size in a range from about 10 nm to 100 nm (in some embodiments, 25 nm to 100 nm, 25 nm to 80 nm, 50 nm to 80 nm, or even 60 nm to 80 nm).

3B. The ultraviolet absorbing hardcoat precursor of either Exemplary Embodiment 1B or 2B, wherein the silica coating has an average thickness in a range from 5 nm to 50 nm (in some embodiments, 10 nm to 40 nm).

4B. The ultraviolet absorbing hardcoat precursor of any preceding B Exemplary Embodiment, wherein the silica coating is surface modified (e.g., by a silane coupling agent).

5B. The hardcoat of any preceding B Exemplary Embodiment, wherein the silica coating has an average thickness of at least 2 nm (in some embodiments, at least 3 nm, 4 nm, 5 nm, 10 nm, 15 nm, 20 nm, 25 nm, or even at least 50 nm; in some embodiments, in a range from 2 nm to 50 nm, 2 nm to 25 nm, or even 2 nm to 10 nm).

6B. An article comprising:
a substrate having a surface, and
a hardcoat layer of any preceding B Exemplary Embodiment disposed on the surface of the substrate.

7B. The article of Exemplary Embodiment 6B, wherein the substrate is a film.

8B. The article of Exemplary Embodiment 6B, wherein the substrate is a polymer plate.

9B. The article of any of Exemplary Embodiments 6B to 8B, further comprising a primer layer between the substrate and the ultraviolet absorbing hardcoat precursor layer.

Advantages and embodiments of this invention are further illustrated by the following examples, but the particular materials and amounts thereof recited in these examples, as well as other conditions and details, should not be construed to unduly limit this invention.

Materials

Unless otherwise noted, all parts, percentages, ratios, etc., in the Examples and the rest of the specification are by weight. Table 1 (below) provides abbreviations used and a source for materials used in the Examples and Comparative Examples described below:

TABLE 1

| Abbreviation | Description |
| --- | --- |
| "A-174" | 3-methacryloxypropyl-trimethoxysilane, obtained from Alfa Aesar, Ward Hill, MA, under trade designation "SILQUEST A-174" |
| "PROSTAB" | 4-hydroxy- 2,2,6,6-tetramethylpiperidine 1-oxyl (5 wt. %), obtained from Aldrich Chemical Company, Milwaukee, WI, under trade designation "PROSTAB" |
| "NANOBYK-3820" | 20 nm diameter ZnO sol***, obtained from BYK-Chemie GmbH, Wesel, Germany, under trade designation "NANOBYK-3820" |
| "AQ-E3913" | 96 nm diameter ZnO sol***, obtained from Resino Color Industry Co., Ltd., Osaka, Japan |
| "L-lysine" | Basic amino acid, obtained from Wako Pure Chemical Industries, Ltd., Osaka, Japan |
| "TEOS" | Tetraethyl orthosilicate, obtained from Wako Pure Chemical Industries, Ltd., Osaka, Japan |
| "SR368" | Trifunctional tris (2-hydroxy ethyl) isocyanurate triacrylate, obtained from Sartomer Americas, Exton, PA, under trade designation "SR368" |
| "KRM8530" | Hexafunctional urethane acrylate, obtained from Daicel-Allnex Ltd., Tokyo, Japan, under trade designation "KRM8530" |
| "TEGO RAD 2250" | Silicone polyether acrylate, obtained from Evonik Industries, Essen, Germany, under trade designation "TEGORAD 2500" |
| "ESACURE ONE" | Difunctional alpha hydroxyketone, obtained from Lamberti, Gallarate, Italy, under trade designation "ESACURE ONE" |
| "IRGACURE 819" | Bis(2,4,6-trimethylbenzoyl)-phenylphosphineoxide, obtained from Ciba Specialty Chemicals, Inc., Basel, Switzerland, under trade designation "IRGACURE 819" |
| 1-methoxy-2-propanol | Solvent, obtained from Aldrich Chemical Company, Milwaukee, WI |
| "A4100" | Poly ethylene terephthalate (PET) film, 50-micrometers thick, obtained from TOYOBO CO., LTD., Osaka, Japan, under trade designation "A4100" |
| "LUMIRROR U32" | Poly ethylene terephthalate (PET) film, obtained from Toray Industries, Inc., Tokyo, Japan, under trade designation "LUMIRROR U32;" 50 micrometers |
| "Methylene Blue" | Methylthioninium chloride, obtained from Wako Pure Chemical Industries, Ltd., Osaka, Japan |
| Ethanol | Solvent, obtained from Wako Pure Chemical Industries, Ltd., Osaka, Japan |

***While the manufacturer of the 20 nm diameter ZnO sol ("NANOBYK-3820") and 96 nm diameter ZnO sol ("AQ-3913") stated that the ZnO nanoparticles had an average particles size 20 nm and 96 nm, respectively, an analysis of these (as-received) product by Transmission Electron Microscopy (TEM) (Model H-8100, from Hitachi, Tokyo, Japan) revealed that the actual average size of ZnO nanoparticles was larger (about 70 nm) for the "NANOBYK-3820" ZnO sol and smaller for the "AQ-E3913" ZnO sol (10-70 nm). The TEM digital photomicrograph of the "as-received" ZnO nanoparticles used in the Examples and Comparative Examples described below are shown in FIGS. 1A (from "NANOBYK-3820" ZnO sol) and 1B (from "AQ-E3913" ZnO sol).

Methods

Method for Determining Optical Properties

The optical properties such as haze and percent transmittance (TT) of the samples, prepared according to the Examples and Comparative Examples, were measured using a haze meter (obtained under the trade designation "NDH5000W" from Nippon Denshoku Industries, Co., Ltd., Tokyo, Japan). Optical properties were determined on as-prepared samples (i.e., initial optical properties) and after subjecting the samples to steel wool abrasion resistance testing and accelerated weather testing. The "Haze Test" compared the difference in haze values before and after subjecting the samples to steel wool abrasion resistance testing and accelerated weather testing.

Method for Determining Steel Wool Abrasion Resistance

The scratch resistance of the samples, prepared according to the Examples and Comparative Examples, was evaluated by the surface changes after the steel wool abrasion test using 30 mm diameter #0000 steel wool after 10 cycles or 100 cycles at 350 grams load and at 60 cycles/minute rate. The strokes were 85 mm long. The instrument used for the test was an abrasion tester (obtained under the trade designation "IMC-157C" from Imoto Machinery Co., LTD, Kyoto, Japan). After the steel wool abrasion resistance test was completed, the samples were observed for the presence of scratches and their optical properties (percent transmittance, haze). ∠ Haze (i.e., haze after abrasion test minus initial haze) were measured again using the method described above.

The presence of scratches was rated as described in Table 2, below.

TABLE 2

| Observation | Rating |
| --- | --- |
| No scratches | 0 |
| A few very faint scratches only observed in reflection | 1 |
| Several faint scratches | 2 |
| Several faint and a few deep scratches | 3 |
| Large number of deep scratches easily observed in reflected or transmitted light. Almost complete removal of coating. | 4 |

Method for Determining Adhesion at Interface Between Coating and Substrate

Adhesion performance of the samples, prepared according to the Examples and Comparative Examples, was evaluated by cross-cut test according to JIS K5600 (April 1999), where 5×5 grid with 1 mm of interval (i.e., 25 one mm by one mm squares) and tape (obtained under the trade designation "NICHIBAN" from Nitto Denko CO., LTD, Osaka Japan) was used.

Method For Determining UV Absorption Property

UV absorption properties were evaluated in range from 200 nm to 800 nm by UV-vis spectroscopy (obtained under the trade designation "U-4100" from Hitachi High-Technologies Corporation, Tokyo, Japan) according to JIS A 5759 (2008), the disclosure of which is incorporated herein by reference.

Method for Evaluating Photocatalytic Activity

The photocatalytic activity was evaluated by measuring the photocatalytic degradation of methylene blue (MB) in water under the illumination of ultraviolet (UV) light (365 nm, 4 mW/cm$^2$). The MB concentration employed was 5 mg/L with 1 wt. % of SiO$_2$ coated ZnO nanoparticles. In degradation experiments, prior to irradiation, the aqueous solution was stirred continuously in the dark for 30 minutes to ensure adsorption/desorption equilibrium. The equilibrium concentration of MB was used as the initial value for the photodecomposition processes. Some intermediates would be formed during MB degradation, and the major absorption band of MB and its degradation intermediates was around 665 nm. In order to investigate the photocatalytic activities of SiO$_2$ coated ZnO nanoparticles and ZnO nanoparticles, the mineralization of MB was evaluated according to the absorption change in this work. The decomposition of MB was monitored by measuring the absorbance of the aliquot solution using the UV-vis spectrophotometer (at 665 nm) in liquid cuvette configuration with de-ionized water as reference.

Preparation of L-lysine-Modified ZnO Sol (Sol-1)

0.146 gram of L-lysine was added to the mixture of 20 grams of ZnO sol ("NANOBYK-3820") and 20 grams of ethanol in a glass jar with stirring at room temperature for 10 minutes. The jar was sealed and placed in an oil bath at 60° C. for 16 hours with stirring, which resulted in the ZnO sol containing surface modified ZnO nanoparticles with L-lysine with an average size of 20 nm (referred to herein as Sol-1).

Preparation of SiO$_2$ Coated ZnO Sol Using L-lysine-Modified ZnO Sol (Sol-2)

A desired amount (2.552, 5.104, or 10.208 grams, as described in Ex-1, below) of TEOS was added into Sol-1 with stirring at room temperature for 10 minutes. The mixture was then transferred to a closed cylindrical polytetrafluoroethylene-lined stainless steel autoclave and heated at 150° C. for 6 hours, which resulted in a SiO$_2$ coated ZnO sol (referred to herein as Sol-2).

Preparation of SiO$_2$ Coated ZnO Sol Using Non-Surface Modified ZnO Sol by Hydrothermal Method (Sol-3)

20 grams of ZnO sol ("NANOBYK-3820"), 20 grams of ethanol and 5.104 grams of TEOS were mixed in a glass jar with stirring at room temperature for 10 minutes. Then, the mixture was transferred to a closed cylindrical polytetrafluoroethylene-lined stainless steel autoclave and heated at 150° C. for 6 hours which result in the SiO$_2$ coated ZnO sol (referred to herein as Sol-3).

Preparation of Modified SiO$_2$ Coated ZnO Using Sol-2 (Sol-4)

1.254 gram of 3-methacryloxypropyl-trimethoxysilane ("A-174") and 0.025 gram of 4-hydroxy-2,2,6,6-tetramethylpiperidine 1-oxyl ("PROSTAB") were added to Sol-2 (amount of TEOS was 5.104 grams) in a glass jar with stirring at room temperature for 10 minutes. The jar was sealed and placed in an oven at 60° C. for 16 hours. Then, 20 grams of 1-methoxy-2-propanol was added and the water and ethanol were removed from the resultant solution with a rotary evaporator at 60° C. until the solid wt. % of the solution was about 40 wt. %. 20 grams of 1-methoxy-2-propanol was charged into the resultant solution, and then the remaining water was removed by using the rotary evaporator at 60° C. This latter step was repeated 2 times for further removal of water from the solution. The final concentration of total ZnO nanoparticles was adjusted to 40 wt. %, which resulted in the 3-methacryloxypropyl-trimethoxysilane modified SiO$_2$ coated ZnO sol (referred to herein as Sol-4).

Preparation of L-lysine-Modified ZnO Sol (Sol-5)

L-lysine modification was performed as described for Sol-1except using ZnO sol ("AQ-E3913") rather than ZnO sol ("NANOBYK-3820") and the amount of L-lysine was 0.073 gram (referred to herein as Sol-5).

Preparation of SiO$_2$ Coated ZnO Sol Using L-lysine-Modified ZnO Sol (Sol-6)

20 grams of water and ethanol mixed solution (water: ethanol=1:1 in wt. %) was added to 20 grams of Sol-5. Then, 5.104 grams of TEOS were added into the above solution with stirring at room temperature for 10 minutes. Then, the mixture was transferred to a closed cylindrical polytetrafluoroethylene-lined stainless steel autoclave and heated at 150° C. for 6 hours, which resulted in the SiO$_2$ coated ZnO sol (referred to herein as Sol-6).

Preparation of Modified SiO$_2$ Coated ZnO Using Sol-6 (Sol-7)

3-methacryloxypropyl-trimethoxysilane ("A-174") modification was performed using Sol-6 as described for Sol-4. The final concentration of total ZnO nanoparticles was adjusted to 20 wt. %, which resulted in 3-methacryloxypropyl-trimethoxysilane ("A-174") modified SiO$_2$ coated ZnO sol (referred to herein as Sol-7).

Preparation of Modified ZnO Sol (Sol-8)

1.254 gram of 3-methacryloxypropyl-trimethoxysilane ("A-174") and 0.025 gram of 4-hydroxy-2,2,6,6-tetramethylpiperidine 1-oxyl ("PROSTAB") were added to the mixture of 20 grams of ZnO sol ("AQ-E3913") and 22.5 grams of 1-methoxy-2-propanol in a glass jar with stirring at room temperature for 10 minutes. The jar was sealed and placed in an oven at 90° C. for 16 hours. The water was then removed from the resultant solution with a rotary evaporator at 60° C. until the solid wt. % of the solution was close to 40 wt. %. 20 grams of 1-methoxy-2-propanol was charged into the resultant solution, and then the remaining water was removed by using the rotary evaporator at 60° C. This latter step was repeated 2 times for further removal of water from the solution. The final concentration of total ZnO nanoparticles was adjusted to 40 wt. %, which resulted in the ZnO sol containing surface modified ZnO nanoparticles (referred to herein as Sol-8).

Preparation of Coating Precursor Solution (C-1)

3.75 grams of Sol-4, and 0.5 gram of trifunctional tris (2-hydroxy ethyl) isocyanurate triacrylate ("SR368") were mixed. 0.06 gram of difunctional alpha hydroxyketone ("ESACURE ONE") was added to the mixture as the photoinitiator. The mixture was adjusted to 20 wt. % in solid by adding 1-methoxy-2-propanol. Finally, 0.02 gram of silicone polyether acrylate ("TEGO RAD 2250") was added to the mixture to provide the coating precursor solution C-1.

Preparation of Coating Precursor Solution (C-2)

5 grams of Sol-7, and 1.25 gram of ("KRM8530") were mixed. 0.04 gram of difunctional alpha hydroxyketone ("ESACURE ONE") and 0.04 gram of bis(2,4,6-trimethylbenzoyl)-phenylphosphineoxide ("IRGACURE 819") were added to the mixture as the photoinitiator. The mixture was adjusted to 20 wt. % in solid by adding 1-methoxy-2-propanol. Finally, 0.006 gram of silicone polyether acrylate ("TEGO RAD 2250") was added to the mixture to provide the coating precursor solution C-2.

Preparation of Coating Precursor Solution (C-3)

7.5 grams of Sol-7, and 0.625 gram of ("KRM8530") were mixed. 0.04 gram of difunctional alpha hydroxyketone ("ESACURE ONE") and 0.04 gram of bis(2,4,6-trimethylbenzoyl)-phenylphosphineoxide ("IRGACURE 819") were added to the mixture as the photoinitiator. The mixture was adjusted to 20 wt. % in solid by adding 1-methoxy-2-propanol. Finally, 0.006 gram of silicone polyether acrylate ("TEGO RAD 2250") was added to the mixture to provide the coating precursor solution C-3.

Preparation of Coating Precursor Solution (C-4)

9 grams of Sol-7, and 0.25 gram of ("KRM8530") were mixed. 0.04 gram of difunctional alpha hydroxyketone ("ESACURE ONE") and 0.04 gram of bis(2,4,6-trimethylbenzoyl)-phenylphosphineoxide ("IRGACURE 819") were added to the mixture as the photoinitiator. The mixture was adjusted to 20 wt. % in solid by adding 1-methoxy-2-propanol. Finally, 0.006 gram of silicone polyether acrylate ("TEGO RAD 2250") was added to the mixture to provide the coating precursor solution C-4.

Preparation of Coating Precursor Solution (C-5)

3.75 grams of Sol-8, and 0.625 gram of ("KRM8530") were mixed. 0.04 gram of difunctional alpha hydroxyketone ("ESACURE ONE") and 0.04 gram of bis(2,4,6-trimethylbenzoyl)-phenylphosphineoxide ("IRGACURE 819") were added to the mixture as the photoinitiator. The mixture was adjusted to 20 wt. % in solid by adding 1-methoxy-2-propanol. Finally, 0.006 gram of silicone polyether acrylate ("TEGO RAD 2250") was added to the mixture to provide the coating precursor solution C-5.

Table 3, below, summarizes the compositions of C-1, C-2, C-3, C-4, and C-5 coating precursor solutions.

TABLE 3

| Component | Amount in Coating Precursor Solution, grams | | | | |
|---|---|---|---|---|---|
| | C-1 | C-2 | C-3 | C-4 | C-5 |
| Sol-4 | 3.75 | 0 | 0 | 0 | 0 |
| Sol-7 | 0 | 5 | 7.5 | 9 | 0 |
| Sol-8 | 0 | 0 | 0 | 0 | 3.75 |
| Trifunctional tris (2-hydroxy ethyl) isocyanurate triacrylate ("SR368") | 0.5 | 0 | 0 | 0 | 0.5 |
| Hexafunctional urethane acrylate ("KRM8530") (80 wt. %) | 0 | 1.25 | 0.625 | 0.25 | 0 |
| Silicone polyether acrylate ("TEGO RAD 2250") | 0.006 | 0.006 | 0.006 | 0.006 | 0.006 |
| Difunctional alpha hydroxyketone ("ESACURE ONE") | 0.06 | 0.04 | 0.04 | 0.04 | 0.04 |
| Bis(2,4,6-trimethylbenzoyl)-phenylphosphineoxide ("IRGACURE 819") | 0 | 0.04 | 0.04 | 0.04 | 0.04 |
| 1-methoxy-2-propanol | 5.75 | 3.75 | 1.875 | 0.75 | 5.75 |
| Total solids wt. % | 20% | 20% | 20% | 20% | 20% |

Coating and Curing of Base Nanoparticle Filled Hardcoat Layer 50 micrometer thick PET film ("LUMIRROR U32;" or "A4100;" 50 micrometers) was fixed on a glass table with level adjustment, and then the coating precursor solution was coated on the substrate by using a Mayer Rod #8. After drying for 5 minutes at 60° C. in the air, the coated substrate was passed two times through a UV irradiator (H-bulb or D-bulb, Model DRS from Heraeus Noblelight America LLC, Buford, Ga.) under nitrogen gas. It was estimated that the coated sample surface was irradiated 900 mJ/cm$^2$, 700 mW/cm$^2$ of ultraviolet (UV-A) radiation.

Example 1 (Ex-1)

Example 1 was Sol-2.

Example 2 (Ex-2)

Example 2 was Sol-6.

Example 3 (Ex-3)

Precursor solution (C-1) was coated on PET film ("LUMIRROR U32;" 50 micrometers) by a Mayer Rod #8. The coating had an estimated dry thickness of 1.5 micrometer. Oven temperature was set at 60° C. After drying for 5 minutes at 60° C., in air, the film was cured by UV (H-bulb) as described in Coating and Curing of Base Nanoparticle Filled Hardcoat Layer.

Example 4 (Ex-4)

Example 4 was prepared as described for Example 3, except that C-2 was coated on the PET film ("A4100;" 50 micrometers) in place of C-1 and D-bulb was used for curing.

Example 5 (Ex-5)

Example 5 was prepared as described for Example 3, except that C-3 was coated on the PET film ("A4100;" 50 micrometers) in place of C-1 and D-bulb was used for curing.

Example 6 (Ex-6)

Example 6 was prepared as described for Example 3, except that C-4 was coated on the PET film ("A4100;" 50 micrometers) in place of C-1 and D-bulb was used for curing.

Example 7 (Ex-7)

Example 7 was prepared as described for Example 5, except that a Mayer Rod #12 was used for coating.

Example 8 (Ex-8)

Example 8 was prepared as described for Example 5, except that a Mayer Rod #16 was used for coating.

Example 9 (Ex-9)

Example 9 was prepared as described for Example 5, except that a Mayer Rod #30 was used for coating.

Comparative Example A (CE-A)

Comparative Example A was Sol-3.

Comparative Example B (CE-B)

Comparative Example B was bare PET film ("LUMIRROR U32;" 50 micrometers).

Comparative Example C (CE-C)

Comparative Example C was bare PET film ("A4100;" 50 micrometers).

Comparative Example D (CE-D)

Comparative Example D was prepared as described for Example 4, except that C-5 was coated on the PET film ("A4100;" 50 micrometers) in place of C-1.

Comparative Example A was solidified after hydrothermal reaction and therefore could not be used further processed.

The particle size and morphology of Example 1 was evaluated by transmission electron microscopy (TEM).

Figure 2:
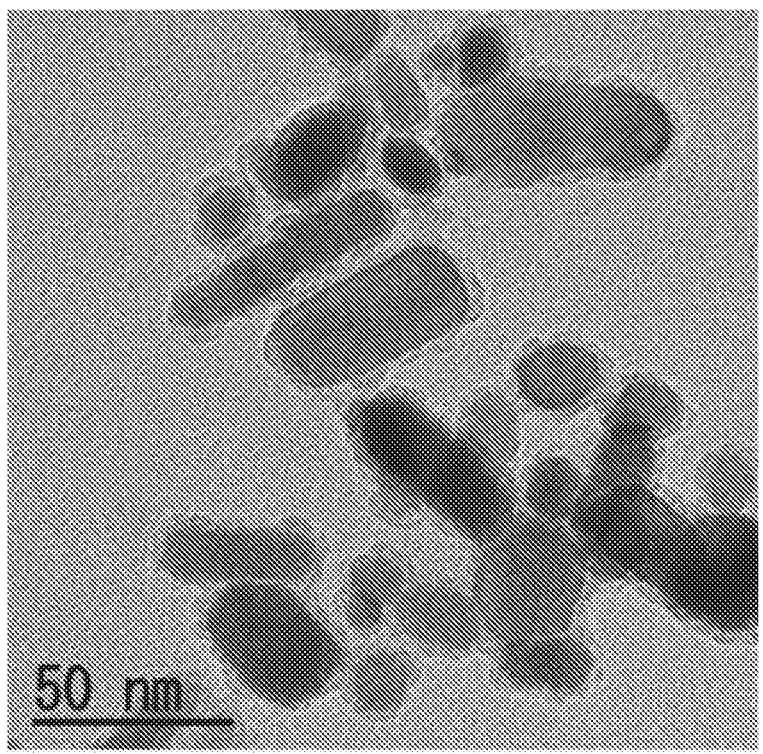
FIG. 2 is a TEM digital photomicrograph of Example 1.

FIG. 2 shows a low magnification TEM image of Example 1 (i.e., Sol-2) that was prepared by using 5.104 grams of TEOS. $SiO_2$ was successfully coated on ZnO without making agglomeration. The $SiO_2$ layer was several nm in thickness and could clearly be observed on the TEM micrograph.

FIGS. 3A, 3B, and 3C show a low magnification TEM image of Example 1 (i.e., Sol-2) that was prepared by using various amounts of TEOS. The thickness of the $SiO_2$ layer was also successfully controlled by varying TEOS concentration in the reaction system. 2.552, 5.104, and 10.208 grams of TEOS in the reaction system resulted in 2 nm (FIG. 3A), 4 nm (FIG. 3B), and 8 nm (FIG. 3C) of $SiO_2$ thickness, respectively. This result indicated that TEOS as the precursor of $SiO_2$ was reacted on the ZnO surface preferentially. Although not wanting to be bound by theory, it was believed that L-lysine helped facilitate successful coating of $SiO_2$.

Figure 4A:
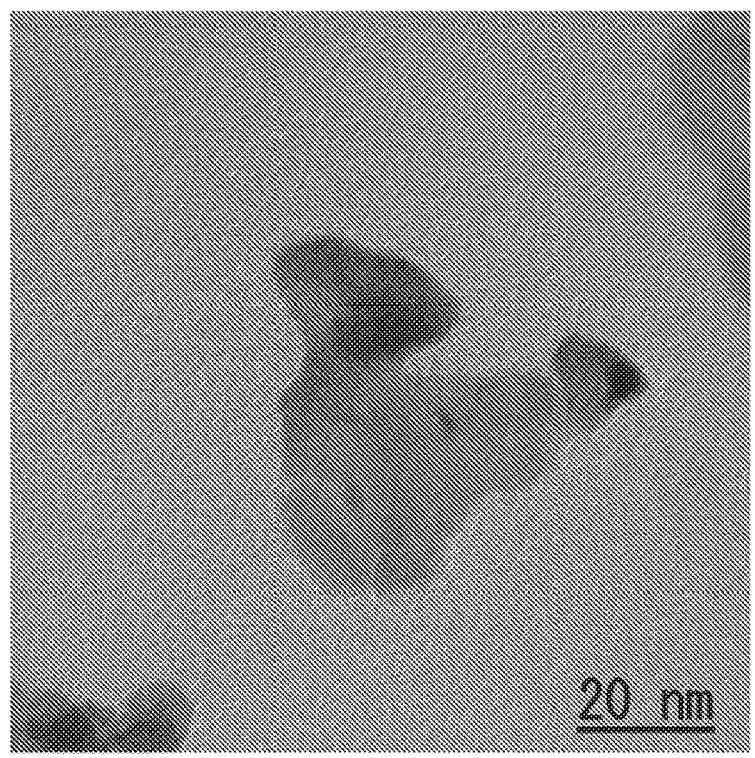
FIG. 4A is a TEM digital photomicrograph of "as received" ZnO nanoparticles (obtained under the trade designation "AQ-E3913" from Resino Color Industry Co., Ltd., Osaka, Japan).
Figure 4B:
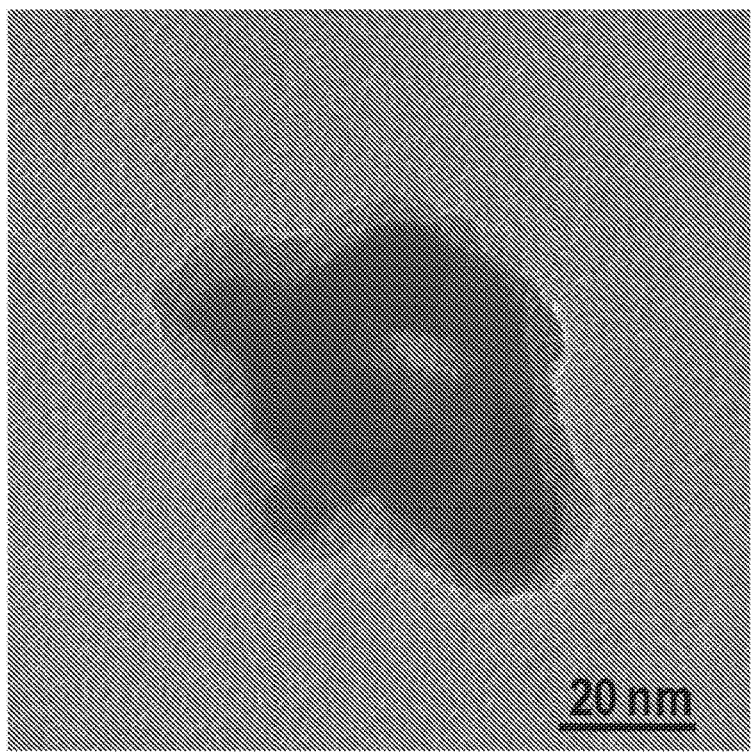
FIG. 4B is a TEM digital photomicrograph of Example 2.

FIGS. 4A and 4B show the TEM images of the as-received ZnO sol ("AQ-E3913") (FIG. 4A) and Example 2 (FIG. 4B) showing that Example 2 (i.e., Sol-6) was successfully coated with $SiO_2$ on ZnO.

Figure 5:
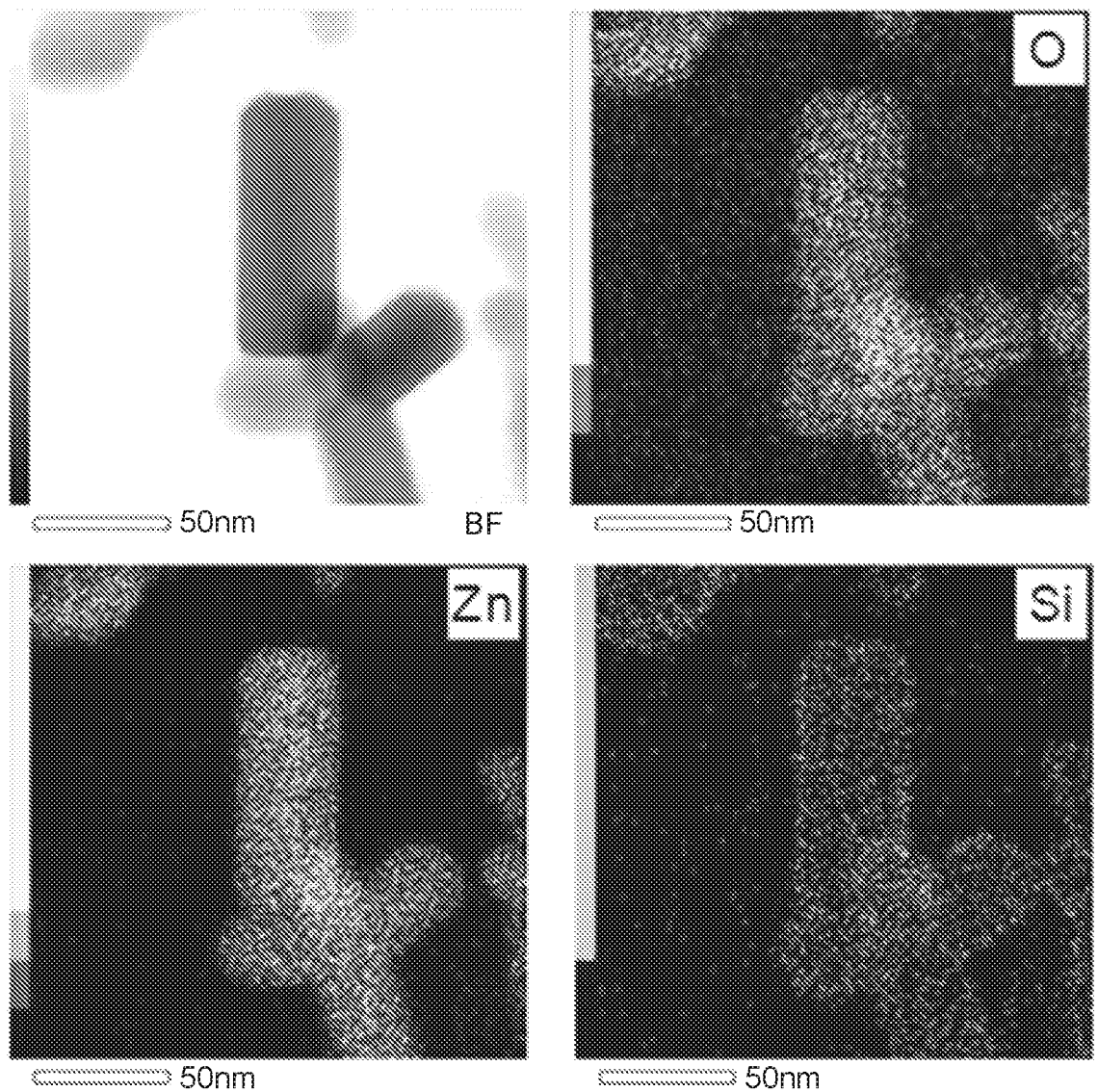
FIG. 5 is a transmission electron microscopy-energy dispersive x-ray spectroscopy (TEM-EDS) mapping image of Example 1.

FIG. 5 shows the transmission electron microscopy-energy dispersive x-ray spectroscopy (TEM-EDS) mapping result of Example 1. Si was clearly detected on the ZnO nanoparticle and almost not detected other places, supporting the conclusion that $SiO_2$ was successfully coated on the ZnO nanoparticle.

Example 1 and Comparative Example A were tested for their photocatalytic activity using the method described above.

Figure 6:
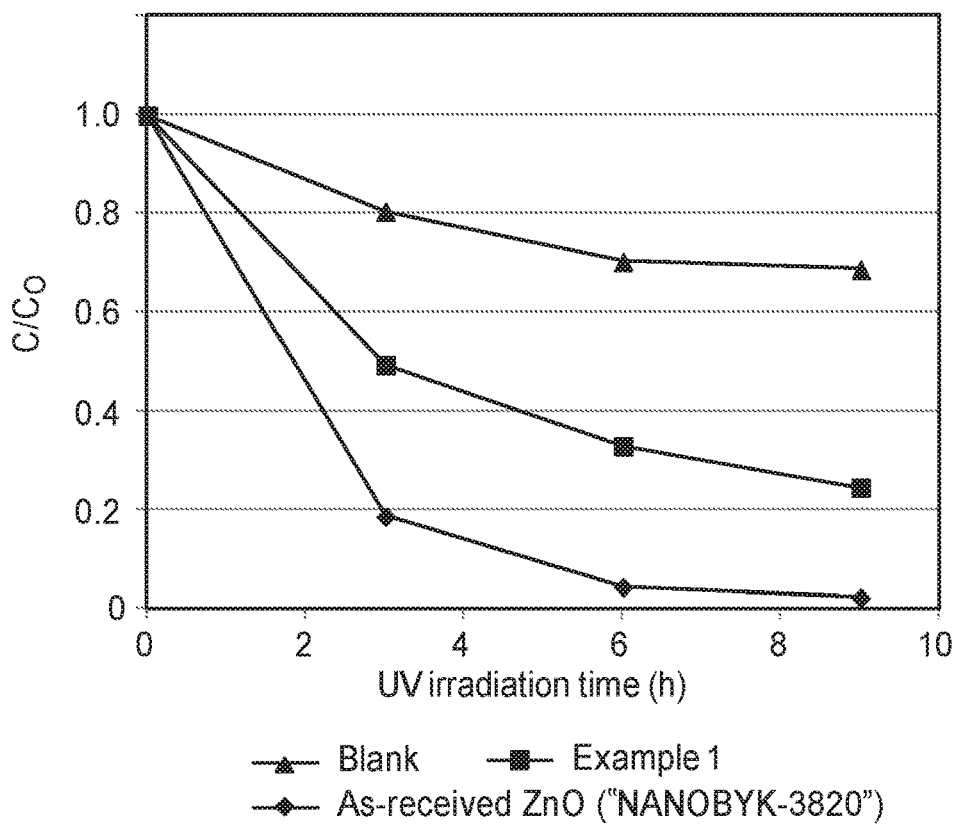
FIG. 6 show photodegradation curves of methylene blue (MB) solution by using Example 1 and "as-received" ZnO (obtained under the trade designation "NANOBYK-3820" from BYK-Chemie GmbH, Wesel, Germany) as catalysts under irradiation with UV light and the visual appearance of MB solution with ZnO nanoparticles after UV irradiation.

FIG. 6 shows photodegradation curves of MB solution by using Example 1 and Comparative Example A as catalysts under irradiation with UV light and their visual appearance of MB solution with the ZnO nanoparticle after UV irradiation. By irradiation with UV light (365 nm), the characteristic absorption of MB at about 665 nm decreases gradually, and finally almost disappears within 9 hours by using as-received ZnO as catalyst (CE-A). On the other hand, the degradation rate was much slower for Example 1 compared to Comparative Example A. The visual appearance of MB solution showed the difference of color clearly. The blue color of the Comparative Example A sol became white gradually, and almost white at 6 hours, while there was almost no change in visual appearance for Example 1 during the same time. This results showed that the $SiO_2$ coating was effective at suppressing the photocatalytic activity of ZnO.

Examples 3, 4, 5, 6, 7, 8, and 9 and Comparative Examples B, C, and D were tested for their UV-absorption performance, optical properties, as well as their durability using methods described above.

Figure 7:
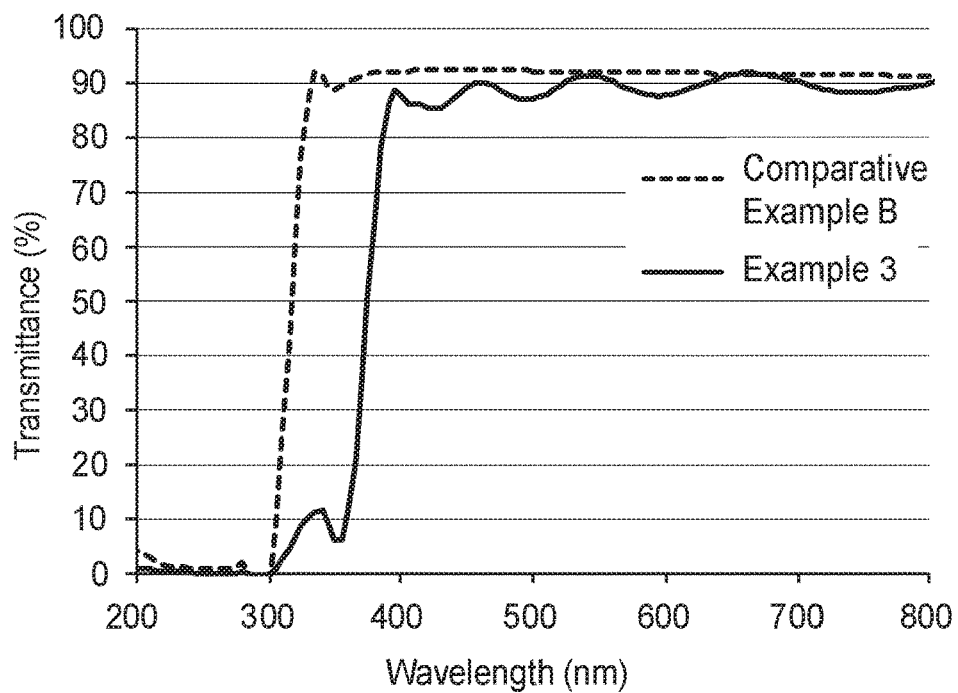
FIG. 7 is an ultraviolet-visible (UV-Vis) spectra of Example 3 and Comparative Example B.
Figure 8:
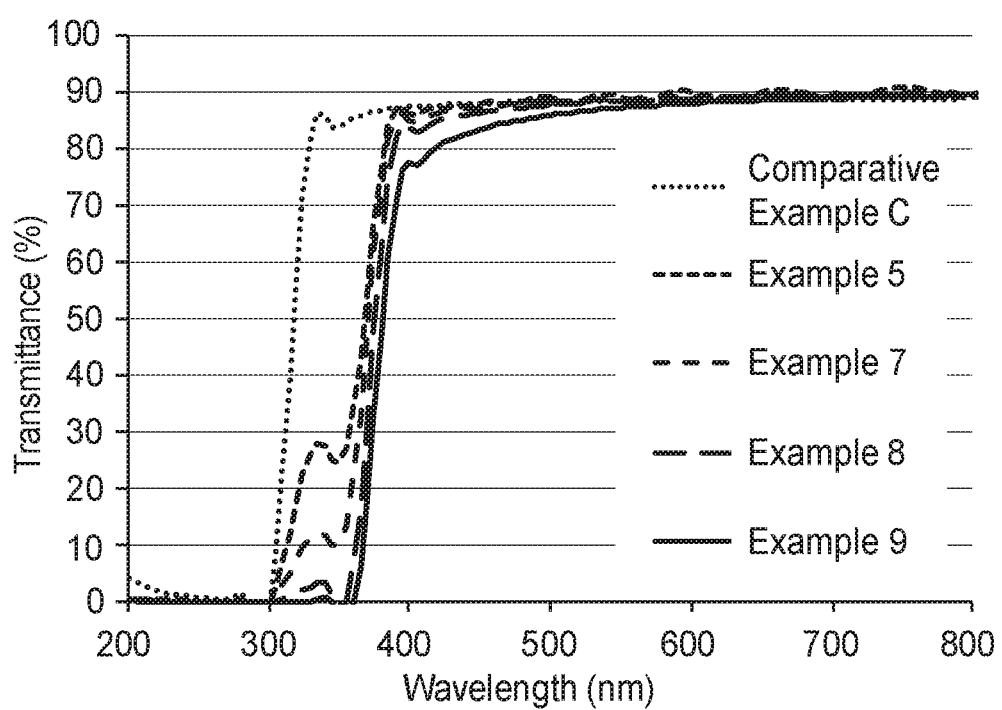
FIG. 8 is a UV-Vis spectra of Examples 5, 7, 8, and 9, and Comparative Example C.

FIG. 7 shows the UV-Vis spectra of Example 3 and Comparative Example B. The UV cut rate of Example 2 was 79.0% while UV cut rate of Comparative Example B was 12.35%. FIG. 8 shows the UV-vis spectra of Examples 5, 7, 8, and 9 and Comparative Example C. The UV cut rate was 61.73%, 72.83%, 84.57%, and 91.48% for Example 5, 7, 8, and 9, respectively, while UV cut rate of Comparative Example C was 17.39%.

Table 4, below, summarizes initial optical properties as well as the durability of Examples 3, 4, 5, 6, 7, 8, and 9 and Comparative Examples B, C, and D after steel wool abrasion testing.

TABLE 4

| Example | Initial Properties | | | After steel wool abrasion test (350 g, 100 cycle) | | | |
|---|---|---|---|---|---|---|---|
| | TT (%) | Haze (%) | UV cut rate (%) | TT (%) | Haze (%) | ⊿ Haze (%) | Scratch Rating |
| Example 3 | 90.71 | 2.43 | 79 | 90.26 | 2.6 | 0.17 | 1 |
| Example 4 | 89.66 | 0.77 | 55.16 | 89.76 | 0.97 | 0.17 | 0 |
| Example 5 | 89.62 | 0.86 | 61.73 | 89.69 | 0.89 | 0.03 | 0 |
| Example 6 | 89.6 | 1.07 | 65.39 | 89.59 | 1.13 | 0.06 | 0 |
| Example 7 | 89.6 | 1.21 | 72.83 | 89.46 | 1.22 | 0.01 | 0 |
| Example 8 | 89.31 | 1.58 | 84.57 | 89.24 | 1.7 | 0.12 | 0 |
| Example 9 | 88.3 | 2.86 | 91.48 | 88.46 | 2.97 | 0.11 | 0 |
| Comparative Example B | 92.51 | 0.8 | 12.35 | 91.98 | 9.99 | 9.19 | 4 |
| Comparative Example C | 89.33 | 0.69 | 17.39 | 89.82 | 7.36 | 6.67 | 4 |
| Comparative Example D | 89.05 | 0.69 | 79.52 | 89.23 | 3.82 | 3.13 | 4 |

Note that all Examples could be maintained with ⊿ Haze less than 0.2% after steel wool abrasion testing after 100 cycles, while all Comparative Examples exhibited much higher values. The scratch rating of Example 3 was 1, the other Examples were 0, and all Comparative Examples were 4. Examples 4, 5, 6, 7, 8, and 9 showed excellent steel wool abrasion resistance and there were no scratches in observation.

In addition, there was hardly any peeling and cracking observed in all Examples after adhesion performance test, leading to the conclusion that Example 2 coatings had excellent adhesion to the PET substrate.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. An ultraviolet absorbing hardcoat comprising:
   a binder, and
   a mixture of ZnO nanoparticles in a range from 1 to 90 wt. %, based on the total weight of the hardcoat, wherein at least a portion of the ZnO nanoparticles are surface modified with L-lysine and have a silica coating thereon, wherein at least 50 percent by number of the ZnO nanoparticles are surface modified with L-lysine and have a silica coating thereon, wherein the ZnO nanoparticles themselves have an average particle size in a range from 10 nm to 100 nm, and wherein the silica coating has an average thickness of at least 2 nm.

2. The hardcoat of claim 1, wherein the silica coating is surface modified.

3. The hardcoat of claim 1, wherein the binder comprises 20 wt. % to 80 wt. %, based on the total weight of the hardcoat.

4. The hardcoat of claim 1 having a haze value less than 3% and ⊿ haze value less than 0.2% according to Method for Determining Optical Properties.

5. An article comprising:
   a substrate having a surface, and
   a hardcoat layer of claim 1 disposed on the surface of the substrate.

6. The article of claim 4, wherein the substrate is a film.

7. The article of claim 4, wherein the substrate is a polymer plate.

8. The article of claim 5, further comprising a primer layer between the substrate and the hardcoat layer.

* * * * *

UNITED STATES PATENT AND TRADEMARK OFFICE
CERTIFICATE OF CORRECTION

PATENT NO. : 11,180,662 B2
APPLICATION NO. : 16/328624
DATED : November 23, 2021
INVENTOR(S) : Taiki Ihara Page 1 of 1

It is certified that error appears in the above-identified patent and that said Letters Patent is hereby corrected as shown below:

In the Claims

Column 18
Line 19, In Claim 6, delete "claim 4" and insert -- claim 5 --, therefor.
Line 20, In Claim 7, delete "claim 4" and insert -- claim 5 --, therefor.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*